(12) United States Patent
Dorfeld et al.

(10) Patent No.: US 7,032,412 B2
(45) Date of Patent: Apr. 25, 2006

(54) METHODS OF MANUFACTURING GLASS SHEETS WITH REDUCED BLISTERS

(75) Inventors: William G. Dorfeld, Salida, CO (US); David M. Lineman, Painted Post, NY (US); Robert Morena, Caton, NY (US); James P. Murphy, Corning, NY (US); Randy D. Ziegenhagen, Elmira, NY (US)

(73) Assignee: Corning Incorporated, Corning, NY (US)

( * ) Notice: Subject to any disclaimer, the term of this patent is extended or adjusted under 35 U.S.C. 154(b) by 453 days.

(21) Appl. No.: 10/387,909

(22) Filed: Mar. 13, 2003

(65) Prior Publication Data

US 2004/0177649 A1    Sep. 16, 2004

(51) Int. Cl.
*C03B 5/225* (2006.01)
(52) U.S. Cl. .............................. 65/53; 65/121; 65/195; 65/134.9; 65/135.1; 65/346; 65/374.11
(58) Field of Classification Search ............... 65/53, 65/121, 193, 195, 134.9, 135.1, 346, 374.11, 65/374.12
See application file for complete search history.

(56) References Cited

U.S. PATENT DOCUMENTS

| | | | |
|---|---|---|---|
| 3,784,384 A | 1/1974 | Webb | 106/39 |
| 3,981,704 A | 9/1976 | Fournier et al. | 65/2 |
| 5,612,924 A | 3/1997 | Miyamoto | 365/233.5 |
| 5,756,223 A * | 5/1998 | Cameron et al. | 428/688 |
| 5,785,726 A | 7/1998 | Dorfeld et al. | 65/134.1 |
| 5,824,127 A | 10/1998 | Bange et al. | 65/90 |
| 6,019,943 A | 2/2000 | Buscemi et al. | 422/8 |
| 6,128,924 A | 10/2000 | Bange et al. | 65/90 |
| 6,251,011 B1 | 6/2001 | Yamazaki | 463/2 |
| 6,629,437 B1 | 10/2003 | Baucke et al. | 65/134.9 |
| 2003/0037572 A1 | 2/2003 | Dick et al. | 65/134.9 |
| 2004/0067369 A1 | 4/2004 | Ott et al. | 428/432 |
| 2005/0050923 A1 * | 3/2005 | Grzesik et al. | 65/135.6 |

FOREIGN PATENT DOCUMENTS

DE        10059580        4/2002

* cited by examiner

*Primary Examiner*—Sean Vincent
(74) *Attorney, Agent, or Firm*—Scott S. Servilla; Thomas R. Beall

(57) ABSTRACT

Methods of manufacturing glass sheets with manufacturing systems that including platinum-containing components are provided. The method includes providing a barrier coating to reduce the hydrogen permeability of the platinum-containing components which reduces the propensity for blistering of glass sheets made using the components.

13 Claims, 4 Drawing Sheets

METHODS OF MANUFACTURING GLASS SHEETS WITH REDUCED BLISTERS

FIELD OF THE INVENTION

This invention relates to forming glasses in an apparatus that utilizes a platinum-containing component.

BACKGROUND OF THE INVENTION

Liquid crystal displays (LCDs) are flat panel display devices that include flat glass substrates or sheets. The fusion process is a preferred technique used to produce sheets of glass used in LCDs because the fusion process produces sheets whose surfaces have superior flatness and smoothness compared to sheet produced by other methods. The fusion process is described in U.S. Pat. Nos. 3,338,696 and 3,682,609, the contents of which are incorporated herein by reference.

Many of the glasses manufactured for flat panel display applications, particularly those formed by fusion processes (also referred to as the downdraw or slot draw processes), are melted or formed using components made from refractory metals, e.g. platinum or platinum alloys. This is particularly true in the fining and conditioning sections of the process, where refractory metals are employed to minimize the creation of compositional inhomogeneities and gaseous inclusions caused by contact of the glass with oxide refractory materials. In addition, many of these manufacturing processes employ arsenic as a fining agent. Arsenic is among the highest temperature fining agents known, and, when added to the molten glass bath, it allows for $O_2$ release from the glass melt at high melting temperatures (e.g., above 1450° C.). This high temperature $O_2$ release, which aids in the removal of bubbles during the melting and fining stages of glass production, coupled with a strong tendency for $O_2$ absorption at lower conditioning temperatures (which aids in the collapse of any residual gaseous inclusions in the glass), results in a glass product essentially free of gaseous inclusions.

From an environmental point of view, it would be desirable to provide alternative methods of making such high melting point and strain point glasses without having to employ arsenic as a fining agent. It would be particularly desirable to find methods for making such glasses via fusion processes. Unfortunately, previous efforts at doing so have been hindered by the production of unacceptable amounts of bubbles in the glass. This has been a particular problem in molten glass systems that employ refractory metals such as platinum or platinum-containing alloys because metals such as platinum (and molybdenum) can cause an electrochemical reaction to occur with the glass which results in bubble formation at the glass/platinum interface, i.e. where the glass contacts the platinum. This bubble formation in the glass/platinum contact regions is also referred as surface blistering.

U.S. Pat. No. 5,758,726 discloses a process for reducing bubbles in glass sheets formed in systems utilizing platinum-containing vessel. The process involves controlling the partial pressure of hydrogen outside the vessel relative to the partial pressure inside the vessel. Another approach for reducing bubbles in glass sheets is disclosed in U.S. Pat. Nos. 6,128,924 and 5,824,127, which disclose the use of various batch constituents to minimize the water content in the glass composition and thus the hydrogen concentration on the inside surface of the platinum-containing melter wall. Although the methods disclosed in the patents mentioned above successfully reduce bubbles in glass sheets formed in systems utilizing platinum-containing components, it would be desirable to provide alternative methods to prevent surface blistering on glass sheets.

SUMMARY

The invention relates to a method of manufacturing a glass sheet in an apparatus that includes a melting, fining delivery, mixing or forming vessel, the vessel including at least one platinum-containing component in contact with the glass. According to one embodiment, the method includes applying a barrier coating on the platinum-containing metal parts, the barrier coating exhibiting hydrogen permeability at temperatures exceeding 1000° C. that is less than the hydrogen permeability of the platinum-containing metal at temperatures exceeding 1000° C. It is to be understood that both the foregoing general description and the following detailed description are exemplary and are intended to provide further explanation of the invention as claimed.

DETAILED DESCRIPTION

Before describing several exemplary embodiments of the invention, it is to be understood that the invention is not limited to the details of construction or process steps set forth in the following description. The invention is capable of other embodiments and of being practiced or carried out in various ways.

This invention is directed to a method of forming glasses in manufacturing systems which employ platinum-containing components. The invention is particularly useful for forming high melting or high strain point glasses, e.g. those used for manufacturing glass substrates for flat panel display devices. The invention provides an alternative to changing the batch constituents of the glass, such as, for example, the addition of arsenic-containing materials to the lass batch. In addition, the invention does not require modification of the partial pressure of the hydrogen outside the platinum-containing components of the apparatus.

Figure 1:
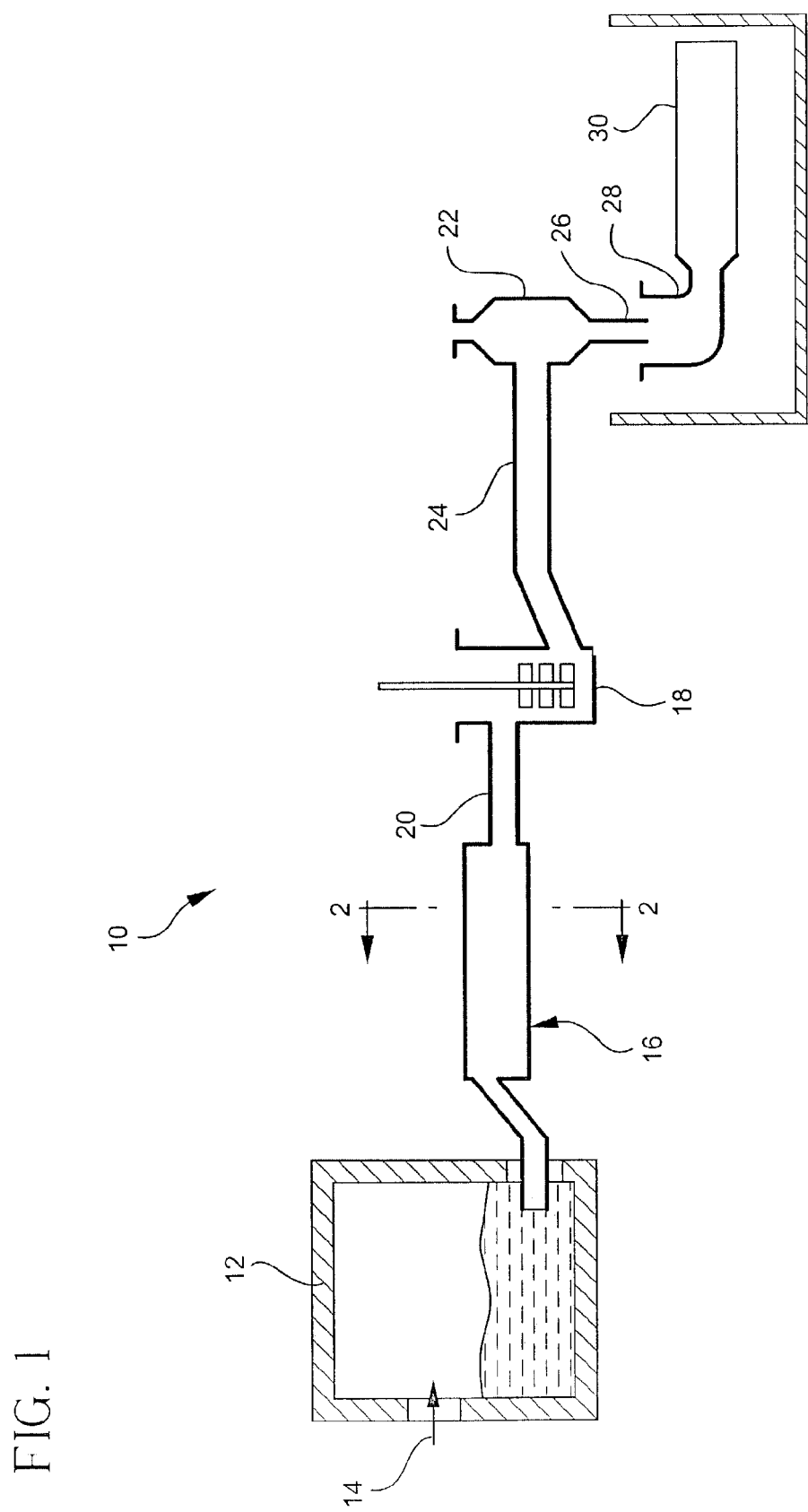
FIG. 1 is a schematic drawing illustrating a representative construction of a glass delivery system for use in a downdraw fusion process for making glass sheets.

The present invention is useful in preventing bubble formation during the melting and forming of glasses in manufacturing systems that utilize platinum-containing components. The present invention makes forming of glasses possible, including high melting point (greater than about 1500° C.) silicate glass compositions, without having to employ substantial amounts of arsenic as a fining agent. Referring to FIG. 1, a schematic view of an apparatus 10 for melting glasses for a downdraw fusion process of making glass sheets is shown. The apparatus 10 includes a melting chamber 12 into which batch materials are introduced as shown by arrow 14, and initial glass melting occurs in the melting chamber 12. The melting chamber 12 is made from refractory materials. The apparatus 10 further includes components that are typically made from platinum or platinum-containing metals. As used herein, platinum-containing means alloys of platinum, which may include Pt—Rh, Pt—Ir, etc, and combinations thereof. The platinum-containing components include at least a finer tube 16, a stir chamber 18, a finer to stir chamber connecting tube 20, a bowl 22, a stir chamber to bowl connecting tube 24, a downcomer 26, and an inlet 28. The finer 16 is a high temperature processing area for removing bubbles, the stir chamber 18 is for mixing the glass, which delivers the glass through the down comer 26, to the inlet 28 and into a fusion pipe 30, which forms a glass sheet.

Figure 2:
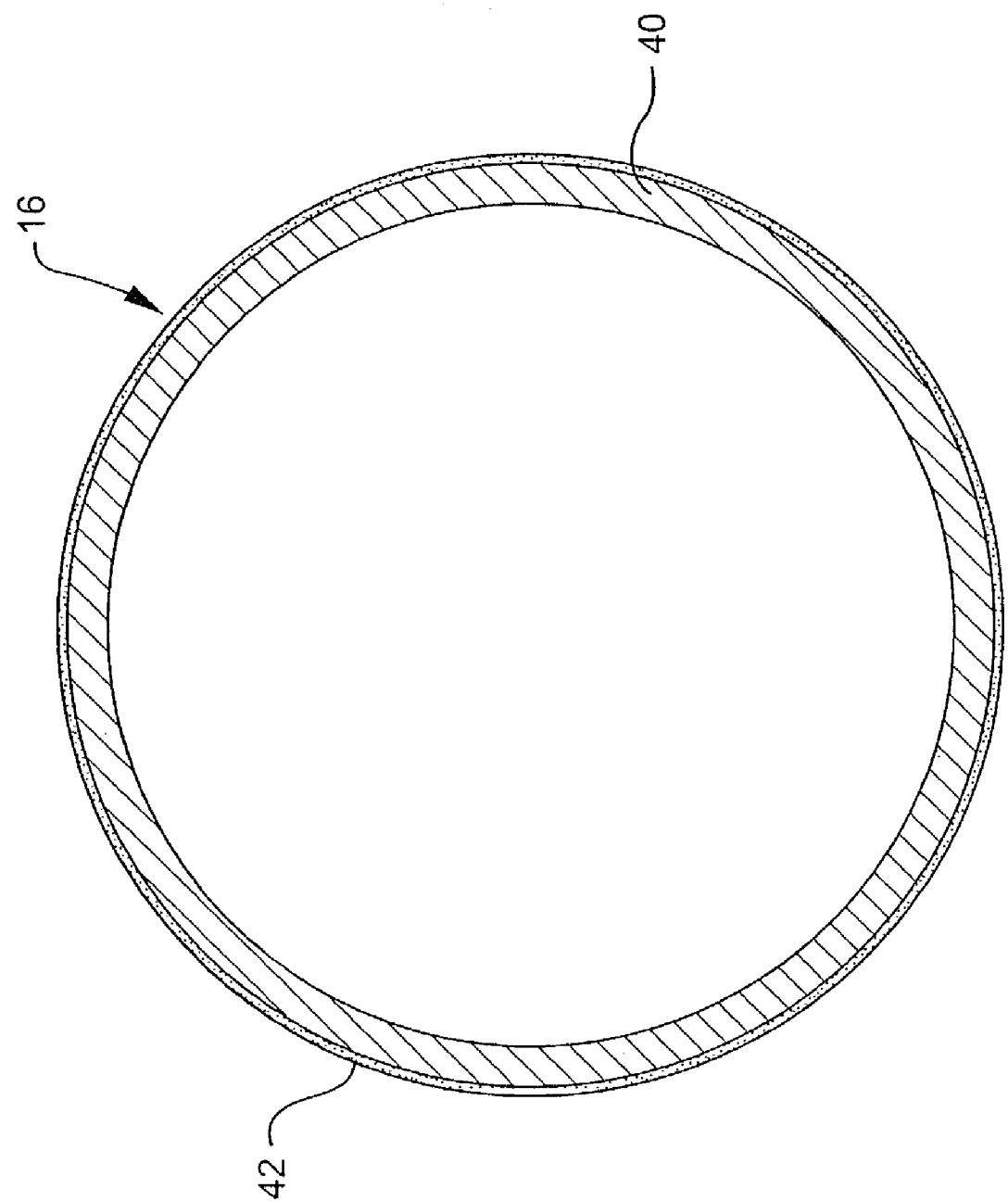
FIG. 2 is a cross-sectional view taken along line 2—2 of FIG. 1.

According to preferred embodiments of the invention, at least a portion of the platinum containing components 16, 18, 20, 22, 24, 26, 28, and preferably all components that are in contact with molten glass are coated on their exterior with a barrier coating to reduce hydrogen permeation through these platinum-containing components. FIG. 2 shows a cross section of the finer tube 16 taken along line 2—2 of FIG. 1. As shown in FIG. 2, the finer tube 16 includes a platinum wall 40, which is typically between about 0.030 inches and 0.060 inches thick. According to one embodiment the present invention, a barrier coating 42 is applied on the outer surface of the platinum-containing tube to reduce hydrogen permeation through the platinum wall 40 of the tube 16.

The apparatus described above can be used to manufacture glass sheets from silicate glass compositions and methods of making such silicate glass compositions while employing, little or no arsenic. The preferred glasses are aluminosilicate or borosilicate glasses. A preferred manufacturing process for such glasses is a downdraw sheet manufacturing process. As used herein, downdraw sheet manufacturing process refers to any form of glass sheet manufacturing process in which glass sheets are formed while traveling in a downward direction. In the fusion or overflow downdraw forming process, molten glass flows into a trough, then overflows and runs down both sides of a pipe, fusing together at what is known as the root (where the pipe ends and the two overflow portions of glass rejoin), and is drawn downward until cool. The overflow downdraw sheet manufacturing process is described, for example, in U.S. Pat. No. 3,338,696 (Dockerty) and U.S. Pat. No. 3,682,609 (Dockerty). One advantage to the fusion forming process is that the glass sheet can be formed without the glass surface contacting any refractory forming surfaces. This provides for a smooth, contaminant-free surface.

Other forms of downdraw sheet forming techniques include the slot draw and redraw forming techniques. In the slot draw technique, molten glass flows into a trough having a machined slot in the bottom. The sheets of glass are pulled down through the slot. The quality of the glass is obviously dependent on the accuracy of the machined slot. Redraw processes generally involve preforming a glass composition into a block of some shape, then reheating and drawing the glass downwardly into a thinner sheet product.

While the invention should not be bound by any theory, it is believed that the bubble forming surface blistering effect which occurs in apparatus employing platinum-containing component occurs as a result of formation of an oxygen rich layer near the platinum-glass melt interface. This oxygen rich layer in the glass is believed to be produced by a combination of electrochemical and chemical reactions. These include thermoelectric electrolysis of the melt, breakdown of multivalent oxides and the breakdown of OH groups and water dissolved in the glass. The latter effect is believed to have the largest impact on the rate of oxygen enrichment at the Platinum/glass interface and the subsequent generation of surface blisters. It is believed that at glass producing temperatures, a portion of the OH groups dissociate into neutral hydrogen and oxygen. When the partial pressure of hydrogen at the platinum component-glass interface (inside the component) is greater than the partial pressure of hydrogen on the outside of the platinum containing components (i.e., the portion of the component not in contact with the glass), hydrogen can then leave the glass by permeation through the platinum skin. This loss of hydrogen causes an enrichment of the surface region (platinum contacting region) of the glass with oxygen which can then form bubbles if the solubility limit of the glass is exceeded.

Application of an appropriate barrier coating to the exterior surface of the platinum-containing components can reduce the rate of hydrogen permeation through the platinum metal. This in turn reduces or eliminates bubble generation. The barrier coating should be able to withstand temperatures of at least about 1000° C., and preferably as high as about 1650° C. The barrier coating must be able to adhere to platinum-containing metal components, particularly at high temperatures, without cracking or degradation of the coating and have a hydrogen permeation rate that is lower than the platinum-containing metals utilized in sheet glass manufacturing systems. In one embodiment, the barrier component includes a glass frit that can applied to the exterior surface of the platinum-containing components using a method such as spraying, brushing, or other appropriate methods. The composite material comprising the barrier coating and the platinum metal has a hydrogen permeability that is at least 10 times less than the hydrogen permeability of bare platinum over the temperature range of about 1000° C. to 1650° C. In certain embodiments, the hydrogen permeability of the composite coating and platinum-containing component is about 100 times less than the hydrogen permeability of the bare platinum from about 1000° C. to 1650° C.

The reduced flux of hydrogen through the platinum-containing components reduces the level of blistering in the glass, and in many cases, eliminates blistering. In preferred embodiments, the barrier coating includes a glass frit, however, the present invention includes any barrier coating that has a low hydrogen permeation rate at temperatures exceeding about 1000° C. Suitable materials for the barrier coating include metals, intermetallics, metal oxides, ceramics, glass-ceramics and glasses. Although FIG. 2 shows the coating on the exterior surface of the platinum-containing component, the coating could be applied on the interior surface of the component so long as it is compatible with the glass produced in the apparatus and does not introduce impurities into the glass. The barrier coating could also be a laminate, a composite material made with platinum or a material alloyed with platinum, so long as the hydrogen permeation rate through the component is reduced to an appropriate level.

Pure platinum has a hydrogen permeation rate that ranges from about $3 \times 10^{14}$ molecules/sec-cm-atmosphere$^{1/2}$ at about 1650° C. to about $2 \times 10^{13}$ molecules/sec-cm-atmosphere$^{1/2}$ at about 1000° C. A typical glass that can be used in accordance with the present invention, for example, Corning Glass code 7740, has a hydrogen permeation rate that ranges from about $3 \times 10^{12}$ molecules/sec-cm-atmosphere$^{1/2}$ at about 1650° C. to about $9 \times 10^{11}$ molecules/sec-cm-atmosphere$^{1/2}$ at about 1000° C., based on data from Shelby, James E., Gas Diffusion in Solids and Melts. (May 1996, ASM International) (ISBN: 0-87170-566-4). When glass is coated on a platinum component, hydrogen must pass through the coating as well as the platinum. The net flux of hydrogen is dependent on the combined permeation and thicknesses of the two materials. The glass coating, with a significantly lower hydrogen permeation rate, lowers the overall permeation rate of the platinum-containing component by up to about 100 times. This decrease in permeation rate is sufficient to prevent oxygen blister formation due to the loss of hydrogen from the glass/platinum interface at the internal portion of the platinum-containing component. At about 1650° C., a 0.005" thick coating of Corning glass code 7740 glass on 0.040" thick Pt would reduce the permeation rate of hydrogen from about $2.9 \times 10^{15}$ molecules/cm$^2$-sec-atmospheres$^{1/2}$ to about $2.2 \times 10^{14}$ molecules/cm$^2$-sec-atmospheres$^{1/2}$.

Without intending to limit the invention in any manner, the present invention will be more fully described by the following example.

EXAMPLE 1

Corning glass code 1737G glass was melted in two separate platinum crucibles at about 1200° C. The two crucibles were exposed to a low dew point atmosphere.

Figure 3:
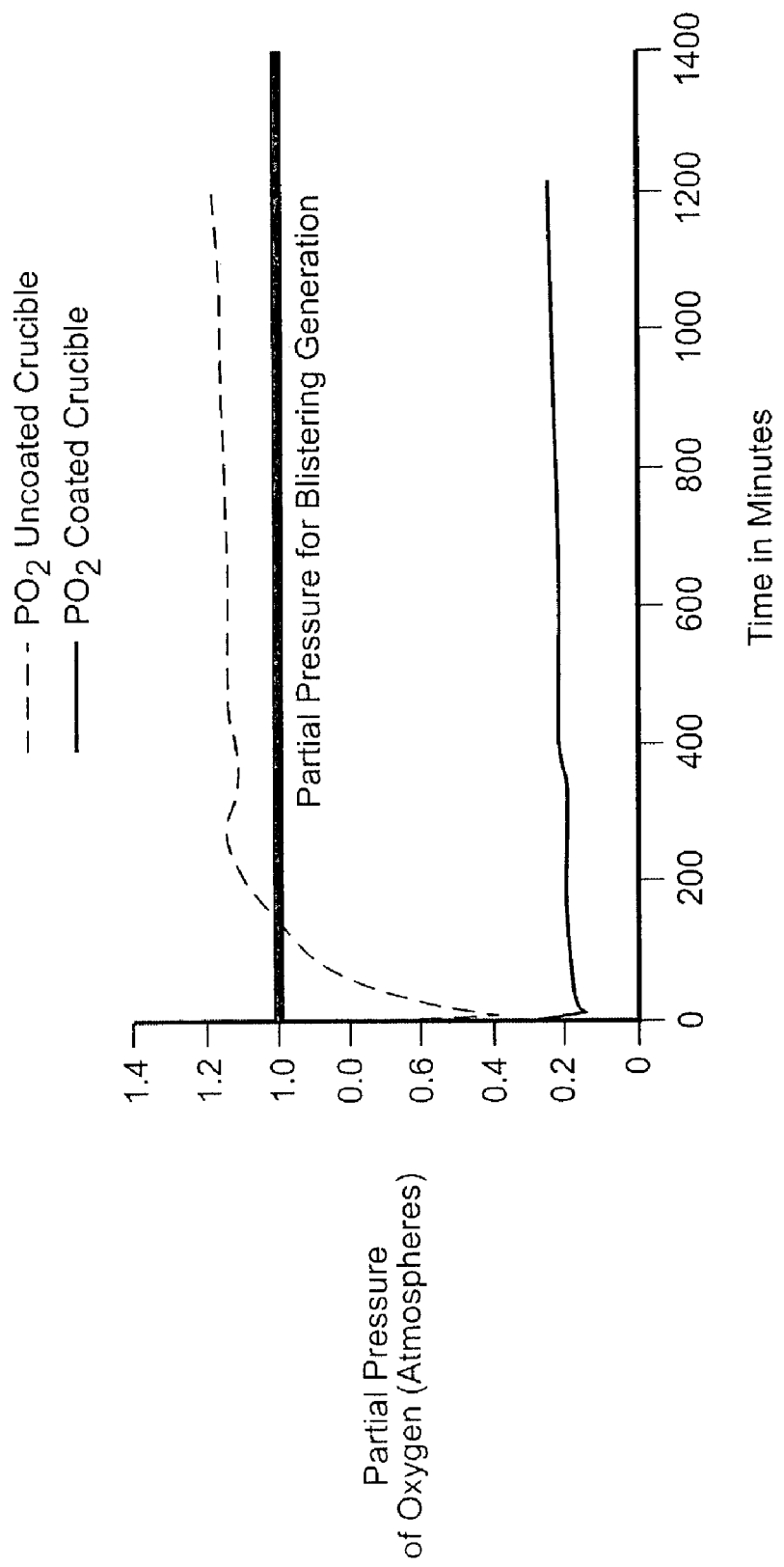
FIG. 3 is a graph showing the relationship of partial pressure of oxygen at the glass/platinum interface versus time for an uncoated platinum crucible and a platinum crucible coated with a barrier coating.

A first platinum crucible was uncoated, and a second platinum crucible was coated with a combination of Vycor (available from Corning, Inc.) and Corning Glass Code 3308 frit (an aluminosilicate lass frit) coated in the following manner. The coating of the crucible involved mixing Vycor and 3308 frit powders with a liquid frit vehicle (amyl acetate) which was then applied to the second crucible surfaces using an ordinary paint sprayer. Several coatings of the solution were applied and dried prior to firing. It was found that the firing cycle needed to reach a minimum of about 1270° C. and held for two hours. In order to obtain the minimum fired coatings thickness of 0.005", a total of three spraying and firing cycles had to be performed. The two crucibles containing Corning Glass Code 1737G glass were then heated to approximately 1200° C. in a dry atmosphere for the times shown in FIG. 3. FIG. 3 shows the effect of a platinum surface coated with glass on hydrogen permeation. The uncoated crucible was covered with blisters, and the coated crucible did not have any blisters. The partial pressure of oxygen at the crucible/glass interface was measured versus a Yttria stabilized zirconia oxygen sensor that was also in the glass. The partial pressure was measured according to the method used in Hayashi, T. and Dorfeld, W. G., Electochemical study of $As^{+3}/As^{+5}$ equilibrium in a barium borosilicate glass melt, published in Journal of Non-Crystalline Solids 177 (1994) 333–334.

As shown in FIG. 3, the Pt/1737G glass interface of the uncoated crucible quickly reached a partial pressure of oxygen of greater than 1 atmosphere, leading to blister formation. This occurred after approximately 200 minutes. The Pt/1737G glass interface of the coated crucible, on the other hand, did not show an increase in the partial pressure of oxygen and no blisters formed. Even after the coated crucible was held at 1200° C. for over 1000 minutes, the partial pressure of oxygen at the Pt/1737G glass interface only showed a slight increase, but still far from the 1 atmosphere partial pressure of oxygen necessary for blistering.

Figure 4:
FIG. 4 is a microphotograph of the surface of crucible after melting glass therein and in which one side of the crucible was coated with a coating according to one embodiment of the invention and the other side was uncoated.

Subsequent testing utilized a standard hot stage microscope with a furnace which was modified so that the dew point of the atmosphere outside the crucible could be controlled. FIG. 4 shows the hot stage test results obtained from using a platinum crucible that was coated on one half with the Vycor/3308 frit combination and uncoated on the other half. As shown in FIG. 4, when Corning glass code 2000G glass was put in this crucible at 1450° C. in a low dew point atmosphere for 45 minutes, the coated half was free from blisters, and the uncoated half was covered with blisters.

EXAMPLE 2

Glass Coating Composition

One particular non-limiting example of a suitable glass that can be used for coating platinum-containing components is a mixture of Vycor® (available from Corning, Inc.) and an aluminosilicate glass frit (Corning glass code 3308 frit). Vycor® contains at least about 96% silica. A 50/50 mixture achieved suitable results in laboratory tests. The blended glass powder had the following approximate composition:

| | |
|---|---|
| $SiO_2$ | 73.7% |
| $Al_2O_3$ | 6% |
| $Na_2O$ | 3.3% |
| $K_2O$ | 5% |
| ZnO | 8.2% |
| $ZrO_2$ | 2.3% |
| $B_2O_3$ | 1.5% |

The mixture contained trace amounts of $Fe_2O_3$, CaO, MgO, and $TiO_2$.

When sprayed on platinum containing surfaces, the coating above stayed on the surfaces at temperatures up to about 1650° C., indicating that it is suitable for use as a coating for components used in a downdraw fusion apparatus. In preferred embodiments, the barrier coating is applied by spraying multiple thin coats of the frit and an amyl acetate binder mixture to the exterior surface of the platinum containing components. Spraying can be achieved using a paint spraying gun or other suitable apparatus. After the coating is dried, it is fired to about 1200° C. to drive off the binder and form a glaze. Preferably, at least two or three separate coatings are applied.

The present invention is believed to be useful in the formation of any oxide glass which is made using a manufacturing process employing a platinum-containing components. The invention is particularly useful for making borosilicate and aluminosilicate glasses, particularly those which have melting points (defined herein as the temperature in which the viscosity corresponds to 200 poise) greater than about 1500° C., as well as glasses having high strain points, i.e., greater than 630°, more preferably greater than 640° C. Such glasses heretofore were typically made using considerable amounts of $As_2O_3$ as a fining agent. The present invention enables the formation of such high melting point and high strain point glasses which are essentially or substantially arsenic-free. The invention is especially useful in forming glass sheets having a silica content greater than 60%. Such glasses are sold by Corning, Inc under the trademark EAGLE 2000. However, the present invention is not limited to the manufacture of any particular type of glass. By substantially arsenic-free it is meant that such glasses have less than 0.02 mole percent $As_2O_3$ (such amounts are normally present as a result of raw material impurity). This is a significant achievement which can immediately be employed in a number of technologies, one in particular being the formation of high strain point glass sheet substrates for flat panel displays. The invention also enables the formation of such high melting point glasses using manufacturing systems which employ platinum or molybdenum or alloys thereof which contact the glass during the melting or forming steps of the manufacturing process. This process is particularly suited for forming glasses which are formed using a downdraw fusion process. The methods of the present invention enable the formation of other high strain point (i.e., greater than about 630° C.) silicate glasses, particularly aluminosilicate and borosilicate glasses, while requiring little or no arsenic as a fining agent.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method of forming a glass sheet utilizing an apparatus that includes a melting, fining, delivery, mixing or forming vessel, the vessel including at least one platinum-containing component in contact with the glass comprising: applying a barrier coating to the platinum-containing metal parts, the barrier coating exhibiting hydrogen permeability at temperatures exceeding 1000° C. that is less than the hydrogen permeability of the platinum-containing metal at temperatures exceeding 1000° C.

2. The method of claim 1, wherein the platinum-containing component plus barrier coating exhibits hydrogen permeability in the temperature range of 1000° C. to 1650° C. that is at least 10 times less than the hydrogen permeability of the platinum-containing component over approximately the same temperature range without the barrier coating.

3. The method of claim 1, wherein the barrier coating comprises a glass frit.

4. The method of claim 1, wherein the barrier coating comprises a material selected from the group comprising metals, metal oxides, ceramics, glasses and combinations thereof.

5. The method of claim 3, wherein the barrier coating is capable of enduring temperatures up to 1650° C.

6. The method of claim 3, wherein the glass frit comprises a mixture of a glass powder comprising 96% silica and a frit comprising a sodium aluminosilicate glass.

7. The method of claim 1, wherein the glass sheet is used in the production of liquid crystal displays.

8. The method of claim 7, wherein the glass sheet is used in the production of active matrix liquid crystal displays.

9. The method of claim 1, wherein the lass sheet is substantially free of bubbles and blisters.

10. A method of making a glass liquid crystal display substrate comprising processing the glass in a melting, fining, delivery, mixing, homogenation, or forming vessel, the vessel including at least one platinum-containing component in contact with the glass, comprising applying a barrier coating over the platinum-containing component, the barrier coating having a hydrogen permeability at temperatures exceeding 1000° C. that is less than the hydrogen permeability of the platinum-containing metal at temperatures exceeding 1000° C.

11. The method of claim 10, wherein the barrier coating reduces the hydrogen permeability of the platinum-containing component by at least a factor of 10.

12. The method of claim 10, further comprising forming said glass using a downdraw glass manufacturing process.

13. The method of claim 12, wherein said downdraw process in said melting step is a fusion process.

* * * * *